United States Patent
Leo et al.

(10) Patent No.: US 10,421,511 B2
(45) Date of Patent: Sep. 24, 2019

(54) PRODUCTION SYSTEM AND METHODS FOR PRODUCING DIFFERENT SHELL ASSEMBLY VARIANTS

(71) Applicant: Daimler AG, Stuttgart (DE)

(72) Inventors: Stefan Leo, Erpolzheim (DE); Heiko Thaler, Sindelfingen (DE)

(73) Assignee: Daimler AG, Stuttgart (DE)

( * ) Notice: Subject to any disclaimer, the term of this patent is extended or adjusted under 35 U.S.C. 154(b) by 372 days.

(21) Appl. No.: 15/027,663

(22) PCT Filed: Sep. 20, 2014

(86) PCT No.: PCT/EP2014/002559
§ 371 (c)(1),
(2) Date: Apr. 6, 2016

(87) PCT Pub. No.: WO2015/051873
PCT Pub. Date: Apr. 16, 2015

(65) Prior Publication Data
US 2016/0251045 A1    Sep. 1, 2016

(30) Foreign Application Priority Data
Oct. 10, 2013  (DE) .................. 10 2013 016 827

(51) Int. Cl.
*B62D 65/02*   (2006.01)
*B23K 37/047*  (2006.01)
(Continued)

(52) U.S. Cl.
CPC ............ *B62D 65/022* (2013.01); *B23K 26/21* (2015.10); *B23K 37/0211* (2013.01);
(Continued)

(58) Field of Classification Search
CPC ...... B62D 65/022; B62D 65/18; B23K 26/21; B23K 37/0461; B23K 37/0211; B23K 37/0435; B23K 37/047; B23K 2201/006
See application file for complete search history.

(56) References Cited

U.S. PATENT DOCUMENTS

| | | |
|---|---|---|
| 7,331,439 B2 | 2/2008 | Degain et al. |
| 2003/0189085 A1 | 10/2003 | Kilibarda et al. |
| 2005/0269382 A1 | 12/2005 | Caputo et al. |

FOREIGN PATENT DOCUMENTS

| | | |
|---|---|---|
| CN | 1706587 A | 12/2005 |
| CN | 101579792 A | 11/2009 |

(Continued)

OTHER PUBLICATIONS

Machine Translation of Poeckl; EP0579160A1; Jan. 19, 1994 (Year: 1994).*

(Continued)

*Primary Examiner* — Ryan J. Walters
(74) *Attorney, Agent, or Firm* — Crowell & Moring LLP

(57) ABSTRACT

A production system and method for producing different shell assembly variants of specific vehicle types is disclosed. The system has several clamping frames adapted to the different shell assembly variants for receiving respective component variants, a magazine in which the clamping frames can be positioned, a clamping station by which, in accordance with a presettable production sequence of the shell assembly variants, the corresponding component variants can be positioned on the clamping frames in a respectively preset joining arrangement, a joining station by which, in accordance with the presettable production sequence, the component variants positioned on the clamping frames can be connected to each other to form the corresponding shell assembly variants, a transport device by which, in accordance with the presettable production sequence, the corre- (Continued)

sponding clamping frames can be moved to and from the magazine, the clamping station, and the joining station exclusively in translation in a plane.

9 Claims, 5 Drawing Sheets

(51) Int. Cl.
*B62D 65/18* (2006.01)
*B23K 37/02* (2006.01)
*B23K 37/04* (2006.01)
*B23K 26/21* (2014.01)
*B23K 101/00* (2006.01)

(52) U.S. Cl.
CPC ........ *B23K 37/047* (2013.01); *B23K 37/0435* (2013.01); *B23K 37/0461* (2013.01); *B62D 65/18* (2013.01); *B23K 2101/006* (2018.08)

(56) References Cited

FOREIGN PATENT DOCUMENTS

| | | |
|---|---|---|
| CN | 101585127 A | 11/2009 |
| CN | 102498028 A | 6/2012 |
| DE | 36 06 058 A1 | 8/1986 |
| DE | 38 23 947 A1 | 1/1990 |
| DE | 102 15 016 A1 | 12/2003 |
| DE | 203 04 022 U1 | 8/2004 |
| DE | 60 2004 003 039 T2 | 3/2007 |
| DE | 20 2008 006 717 U1 | 10/2009 |
| EP | 0 579 160 A1 | 1/1994 |
| GB | 157237 A | 10/1921 |
| GB | 2 153 752 A | 8/1985 |
| GB | 2 172 555 A | 9/1986 |
| WO | WO 2014/019693 A1 | 2/2014 |

OTHER PUBLICATIONS

PCT/EP2014/002559, International Search Report (PCT/ISA/220 and PCT/ISA/210) dated Jan. 26, 2015, with partial English translation, enclosing Written Opinion of the International Searching Authority (PCT/ISA/237) (Thirteen (13) pages).

Chinese Office Action issued in Chinese counterpart application No. 201480055715.5 dated Jan. 4, 2017, with partial English translation (Twelve (12) pages).

German Office Action issued in German counterpart application No. 10 2013 016 827.9 dated Jul. 2, 2018 (Five (5) pages).

\* cited by examiner

PRODUCTION SYSTEM AND METHODS FOR PRODUCING DIFFERENT SHELL ASSEMBLY VARIANTS

The invention relates to a production system and methods for producing different shell assembly variants, in particular side wall assembly variants, of specific vehicle types.

DE 20 2008 006 717 U1 shows a machining station for vehicle bodies and parts thereof. The machining station comprises at least one frame magazine for one or more clamping frames and an infeed mechanism for the clamping frames, which can be placed over the workpieces from above. In this process the frame magazines are positioned above a work and transport area, into which the vehicle bodies and parts thereof are fed and in which they are machined. Depending on the vehicle body variant and the part variants thereof, the required clamping frames can each be lowered by means of a suitable hoist mechanism in order to position the vehicle bodies and the parts thereof precisely in relation to each other before they are welded together.

The problem addressed by the present invention is that of providing a production system as well as a method for producing different shell assembly variants with which a high output can be achieved in a particularly reliable fashion.

The production system according to the invention for producing different shell assembly variants, in particular side wall assembly variants, of specific vehicle types comprises several clamping frames, which are adapted to the different shell assembly variants, for receiving the respective component variants. The production system of the invention also comprises a magazine in which the clamping frames can be arranged. The production system of the invention additionally comprises a clamping station by means of which, in accordance with a presettable production sequence for the shell assembly variants, the corresponding component variants can be positioned on the clamping frames in a respectively preset joining arrangement. The production system of the invention further comprises a joining station by means of which, in accordance with the presettable production sequence, the component variants positioned on the clamping frames can be joined together to form the corresponding shell assembly components. The production system of the invention lastly comprises a transport device by means of which, in accordance with the presettable production sequence, the corresponding clamping frames can be moved exclusively in translation in a plane to and from the magazine, the clamping station, and the joining station.

In contrast to the machining station disclosed in DE 20 2008 006 717 U1, in the production system of the invention it is therefore not necessary to move the clamping frames in a vertical direction in order to supply them in accordance with the shell assembly variants to be produced. Because the magazine, the clamping station, and the joining station are all disposed in the same plane, just the clamping frames that are needed for the specific shell assembly variant to be produced can be moved purely in translation. The production system can thus be operated in a particularly fail-proof manner because the conveying technology for the clamping frames can be designed in a particularly expedient manner due to the purely translational movement. Also, the output of the shell assembly variants to be produced can be increased because the clamping frames can be supplied to and removed from the joining station especially quickly.

In an advantageous configuration of the invention, provision is made that the magazine comprises several receiving areas, in which the clamping frames can be displaced in a movement direction and can be received parallel to each other. A particularly wide variant diversity of shell assembly variants can thus be produced with a large number of clamping frames suitably adapted to specific variants, wherein very little space is needed because the clamping frames can be displaced and stored parallel to each other in the magazine.

Another advantageous embodiment of the invention provides that the clamping station comprises several robot-controlled grippers, by means of which the component variants can be positioned on the clamping frames. The clamping frames supplied to the clamping station in a respectively variant-specific manner can thus be fitted automatically with the different component variants in a particularly simple manner.

Another advantageous embodiment of the invention provides that the grippers can be adjusted to fit the specific geometries of the component variants, in accordance with the presettable production sequence. In other words, the grippers can be used for all variants because the grippers can be adjusted to fit the different component variants to be produced. Hence complex changeover procedures can be dispensed with, and the cycle time of the production facility can be reduced accordingly.

In another advantageous configuration of the invention, provision is made that the production system comprises an extraction station, at which the respective shell assembly variants for the clamping frames can be extracted. The finished shell assembly variants can thus be shunted from the running cycle of the production system in a particularly easy and expedient fashion.

Another advantageous embodiment of the invention provides that the clamping frames can be moved from the extraction station to the magazine and positioned therein by means of the transport device. The extraction station is likewise disposed in the same plane as the magazine, the clamping station, and the joining station such that purely translational movements suffice for feeding the clamping frames back into the magazine after the extraction of the respective shell assembly variants.

In another advantageous embodiment of the invention, provision is made that the production comprises conveyor belts, by means of which the corresponding component variants can be conveyed to the clamping station in accordance with the production sequence. A large number of different component variants can thus be supplied in a timely fashion, in accordance with the presettable production sequence of the shell assembly variants, to the clamping station for equipping each of the variant-specific clamping frames provided.

According to another advantageous embodiment of the invention, provision is made that the clamping frames comprise respective clamping devices for fixing the component variants. For example, if a welding technique is used as a joining method, each of the variant-specific components can thus be positioned relative to one another in a precise manner appropriate for welding, such that the welding procedures subsequent to the clamping station can be performed in the joining station in a particularly reliable manner.

Another advantageous embodiment of the invention provides that the clamping frames comprise receiving areas for the component variants for a specific shell assembly element on a first side, and receiving areas for the component variants for the same or for another shell assembly variant on a second side. The output of the production system can thus be increased even further since both sides of the clamping frames can be used, thereby permitting, for example, left and right shell assembly variants of the same vehicle type or even of different vehicle types to be manufactured in a single cycle.

The method according to the invention for producing different shell assembly variants, in particular side wall assembly variants, of specific vehicle types comprises the following steps:

selection of respective clamping frames from a plurality of variant-specific clamping frames arranged in a magazine in accordance with a preset production sequence of shell assembly variants;

translational movement of each of the selected clamping frames from the magazine to a clamping station, which is disposed in the same plane as the magazine;

positioning of corresponding component variants in an appropriate joining position on the respective clamping frames moved to the clamping station in accordance with the preset production sequence;

translational movement of the respective clamping frames fitted with the component variants from the clamping station to a joining station, which is disposed in the same plane as the clamping station; and joining of the respective component variants in the joining station, in accordance with the preset production sequence, to form the corresponding shell assembly variants.

Advantageous configurations of the production system of the invention are thus to be considered as advantageous configurations of the method of the invention.

Other advantages, features, and details of the invention will emerge from the following description of preferred exemplary embodiments and from referring to the drawings. The features and feature combinations cited in the preceding description as well as the features and feature combinations cited in the following figure descriptions and/or shown in the figures alone are not only usable in the each of the given combinations, but also in other combinations or alone, without exceeding the scope of the invention.

DETAILED DESCRIPTION OF THE DRAWINGS

Figure 1:
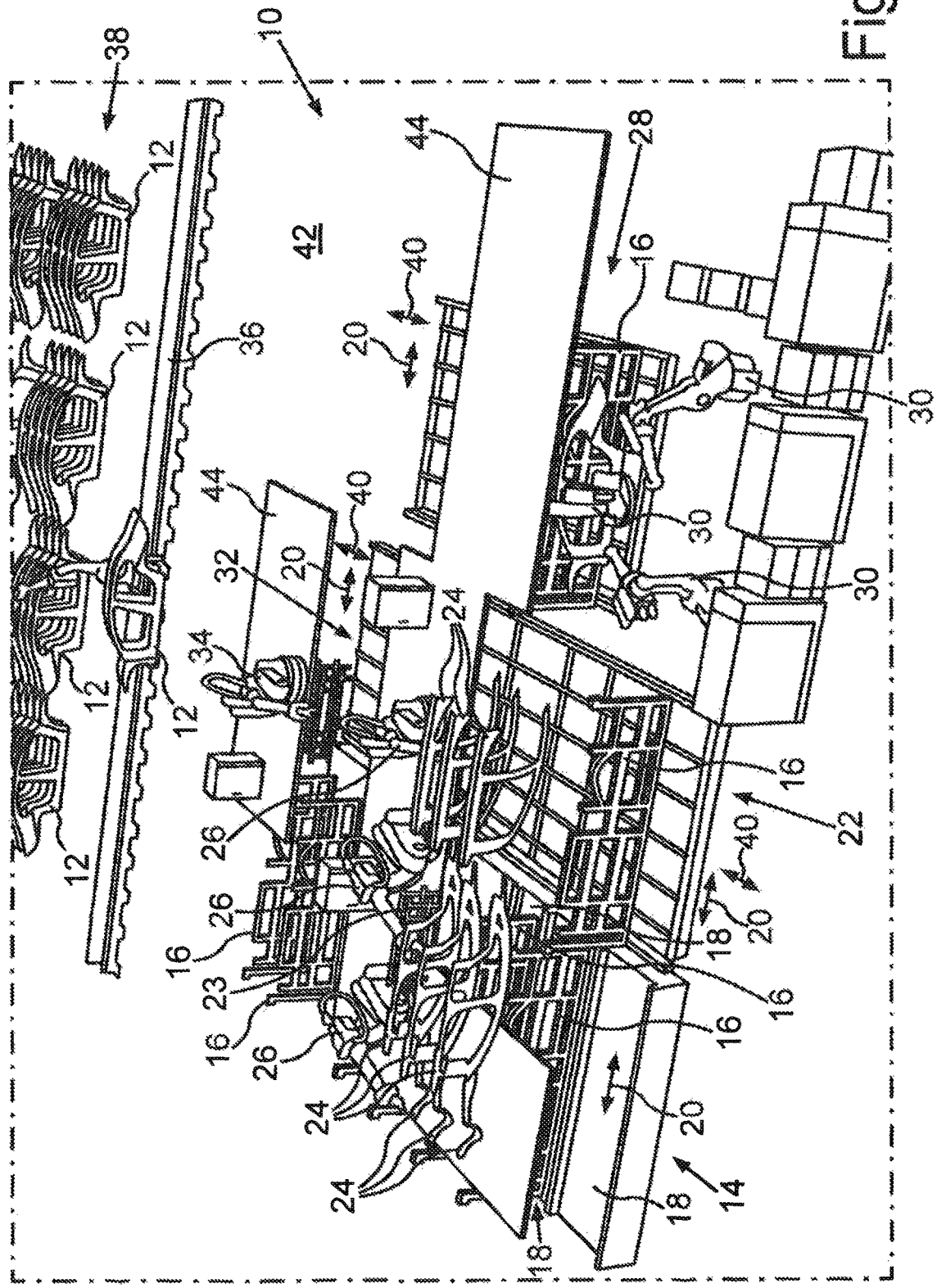
FIG. 1 is a perspective view of a production system for producing different shell assembly variants in the form of side wall assembly variants of specific vehicle types, wherein the production system comprises a magazine for receiving a large number of variant-specific clamping frames, a clamping station for the robot-assisted fitting of the clamping frames with different component variants, a joining station with several welding robots for welding the component variants, and an extraction station for extracting the finished welded side wall assembly variants.

A production system for producing different shell assembly variants 12 in the form of side wall assembly variants of specific vehicle types, designated in its entirety by 10, is shown in a perspective view in FIG. 1. The production system 10 comprises a magazine 14, in which a large number of clamping frames 16 are received displaceably in a movement direction designated with the arrow 20 and parallel to each other in respective receiving areas 18.

The clamping frames 16 are each adapted in a variant-specific manner for receiving respective component variants 24 that belong to the different shell assembly variants 12.

The production system 10 also comprises a clamping station 22 by means of which, in accordance with a preset-table production sequence of the shell assembly variants 12, the corresponding component variants 24 can be positioned on the clamping frames 16 in a respectively preset joining arrangement once the components have been positioned in the clamping station 22.

Three robots 26 are arranged on the clamping station 22 for this purpose, which robots are equipped with respective grippers (not specified any further here) with which the component variants 24 can be positioned on the respective clamping frames 16. The grippers not specified any further can be adjusted in accordance with the presettable production sequence of the shell assembly variants 12 to fit the respective geometries of the component variants 24 to be gripped, such that the different individual component variants 24 can be accommodated, gripped, and suitably mounted on the respective clamping frames 16 with the same robot-controlled gripper.

A joining station 28, which is configured as a welding station with three welding robots 30 in the present exemplary embodiment, is arranged to the right of the clamping station 22. With the aid of the welding robots 30, the component variants 24 positioned on the clamping frame 16 can be welded together to form the corresponding shell assembly variants 12, in accordance with the presettable production sequence of the shell assembly variants 12. Use can be made of, for example, laser welding as a joining technique. As an alternative, use can be made of a combined (mechanical, chemical, and/or thermal) joining technique.

The clamping frames 16 additionally comprise clamping devices (not illustrated here) for fixing the respective component variants 24 on receiving areas (not specified any further here) of the clamping frames 16. The individual component variants 24, which were mounted on the clamping frames 16 at the clamping station 22, can thus be fixed in a joining position in relation to the clamping frames 16 and in relation to each other, such that the individual component variants 24 can be welded together in the joining station 28 by the welding robots 30 in a particularly reliable fashion to form the respective shell assembly variants 12.

The production system 10 also comprises an extraction station 32, at which the respective shell assembly variants 12, once they have been finished and transferred from the joining station 28 to the extraction station 32, can be extracted from the clamping frames 16. In the case illustrated here, another robot 34 with which the finished shell assembly variants 12 can be extracted from the clamping frames 16 is disposed at the extraction station 32. The extracted and finished shell assembly variants 12 can then be conveyed by means of the robot 34 to a transfer line 36, from which the finished shell assembly variants 12 can be temporarily stored in an interim storage facility 38.

The magazine 14, the clamping station 22, the joining station 28, and the extraction station 32 are all arranged in the same plane, at ground level in the present case, so that the clamping frames 16 can be moved exclusively in translation to and from the magazine 14 and the other stations 22, 28, 32 by means of a transport device, which is not specified any further here. In the present case, the clamping frames 16 are each displaceable only in the movement direction 18 designated by the double arrows and in the movement direction 40 aligned orthogonally thereto. For example, the transport device can comprise respective transport means (not specified any further here) in the form of conveyor belts, spindle drives, or the like, by means of which the respective clamping frames 16 can be moved to and from the magazine 14, the clamping station 22, the joining station 28, and the extraction station 32.

The production system 10 also comprises conveyor belts, which are not illustrated here and by means of which the corresponding component variants 24 can be conveyed to the clamping station 22 in accordance with the production sequence of the shell assembly variants 12.

The robots 26, 34 of the clamping station 22 and of the extraction station 34, respectively, are thus disposed on respective planes 44 that are located above the magazine 14 disposed at ground level of the clamping station 22, above the joining station 28, and above the extraction station 32, which are disposed on the plane 42. By virtue of it being disposed on two different planes 42, 44, the production station 10 can be configured in a particularly space-saving manner.

A method for producing the different shell assembly variants 12 shall be explained in the following, with reference to FIGS. 1 through 5. For each production cycle, a respective clamping frame 16 is first selected from a plurality of variant-specific clamping frames 16 arranged in the magazine 14 in accordance with the preset production sequence of the shell assembly variants 12. The selected clamping frame 16 is then moved in translation from the magazine 14, in the movement direction indicated by the double arrow 18, from the magazine 14 toward the right to the clamping station 22. In the case shown in FIG. 1, the clamping frame 16, which is the foremost one illustrated on the clamping station 22, has just been moved in translation out of the now empty receiving area 18 of the magazine 14 and into the clamping station 22.

Figure 2:
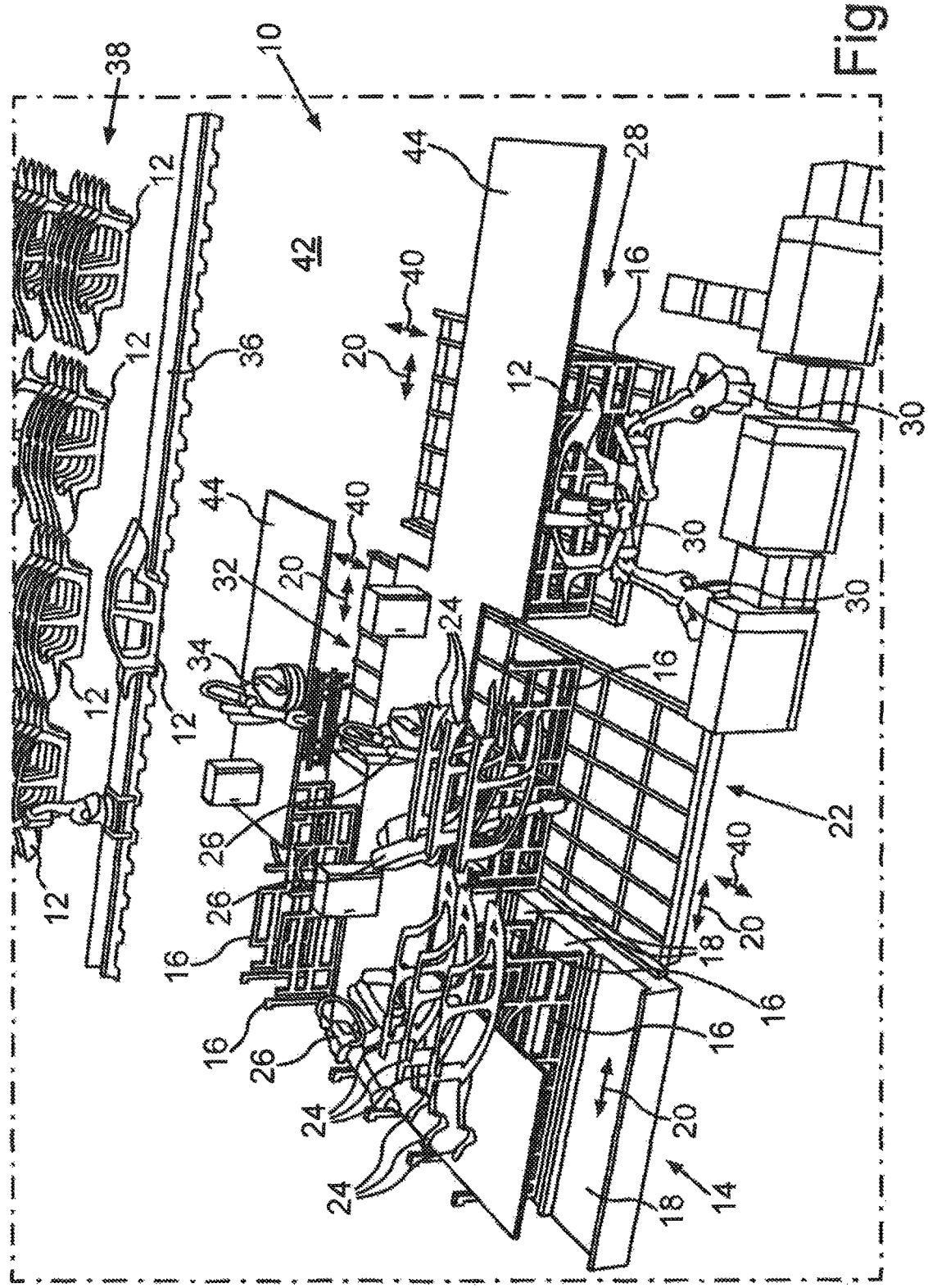
FIG. 2 is another perspective view of the production system, wherein a clamping frame is in the process of being fitted with a plurality of component variants.

The production system 10 is illustrated in a subsequent method step in FIG. 2, in which the clamping frame 16 that was previously extracted from the magazine 14 and conveyed to the clamping station 22 has just been moved in the movement direction 40 to the robots 26. Once the clamping frame 16 in question has been suitably positioned within reach of the robots 26, the latter fit the clamping frame 16 with the respective component variants 24, which are selected in accordance with the shell assembly variant 12 to be produced.

The component variants 24 are arranged in a suitable joining position on the clamping frame 16, and then fixed thereto by means of suitable clamping devices (not specified any further here) of the clamping frame 16. Once the component variants 24 have been fixed to the clamping frame 16, the clamping frame 16 is moved in translation in the movement direction 18 toward the right into the joining station 28.

Figure 3:
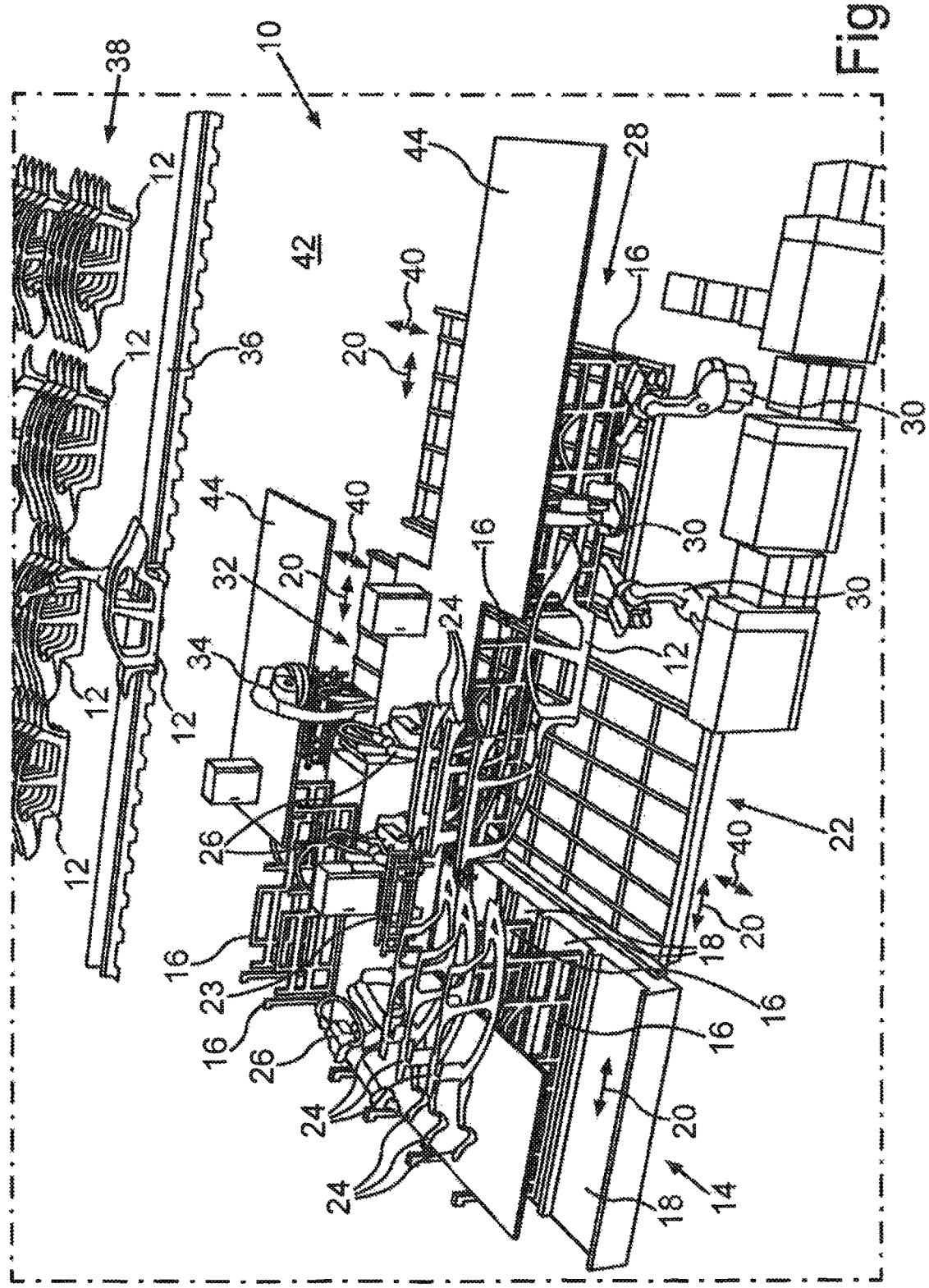
FIG. 3 is another perspective view of the production system, wherein the clamping frame just fitted with the component variants is being transferred from the clamping station toward the right to the joining station.

The production system 10 is shown in another full perspective view in FIG. 3, in which the previously equipped clamping frame 16 is being moved from the clamping station 22 to the joining station 28.

Figure 4:
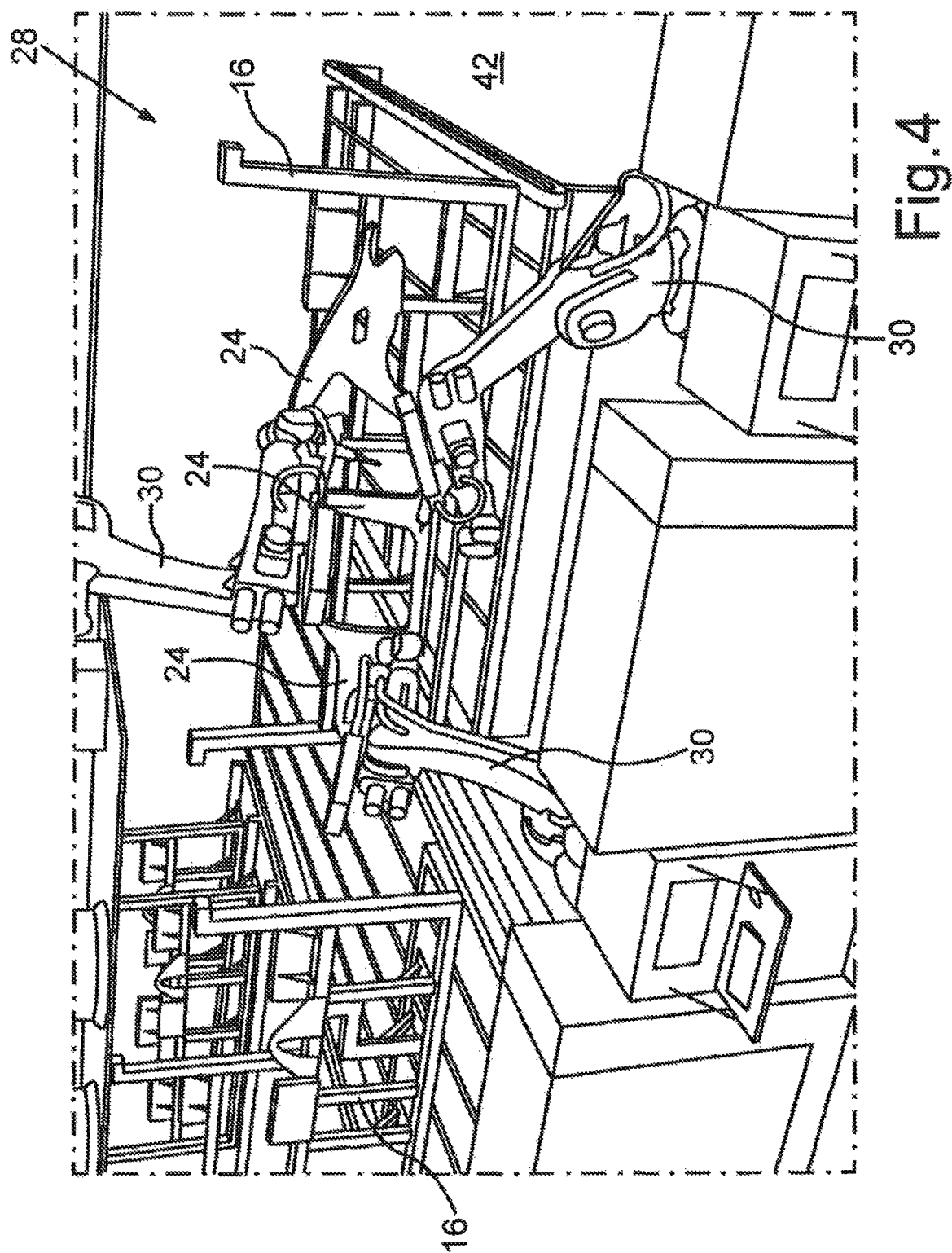
FIG. 4 is a perspective detailed view of the joining station of the production system, wherein three welding robots are welding the three component variants fixed on one of the clamping frames together to form a side wall assembly variant.

FIG. 4 shows essentially the joining station 28 in a perspective detailed view, in which the respective component variants 24 are being welded together to form a finished shell assembly variant 12 by means of the welding robots 30. In this process, the welding robots 30 recognize which shell assembly variant 12 is to be produced and use the respective welding lines required for this particular shell assembly variant 12.

Once the corresponding shell assembly variant 12 has been formed by welding the individual component variants 24 together, the clamping frame 16 along with the finished shell assembly variant 12 is transferred from the joining station 28 to the extraction station 32.

Figure 5:
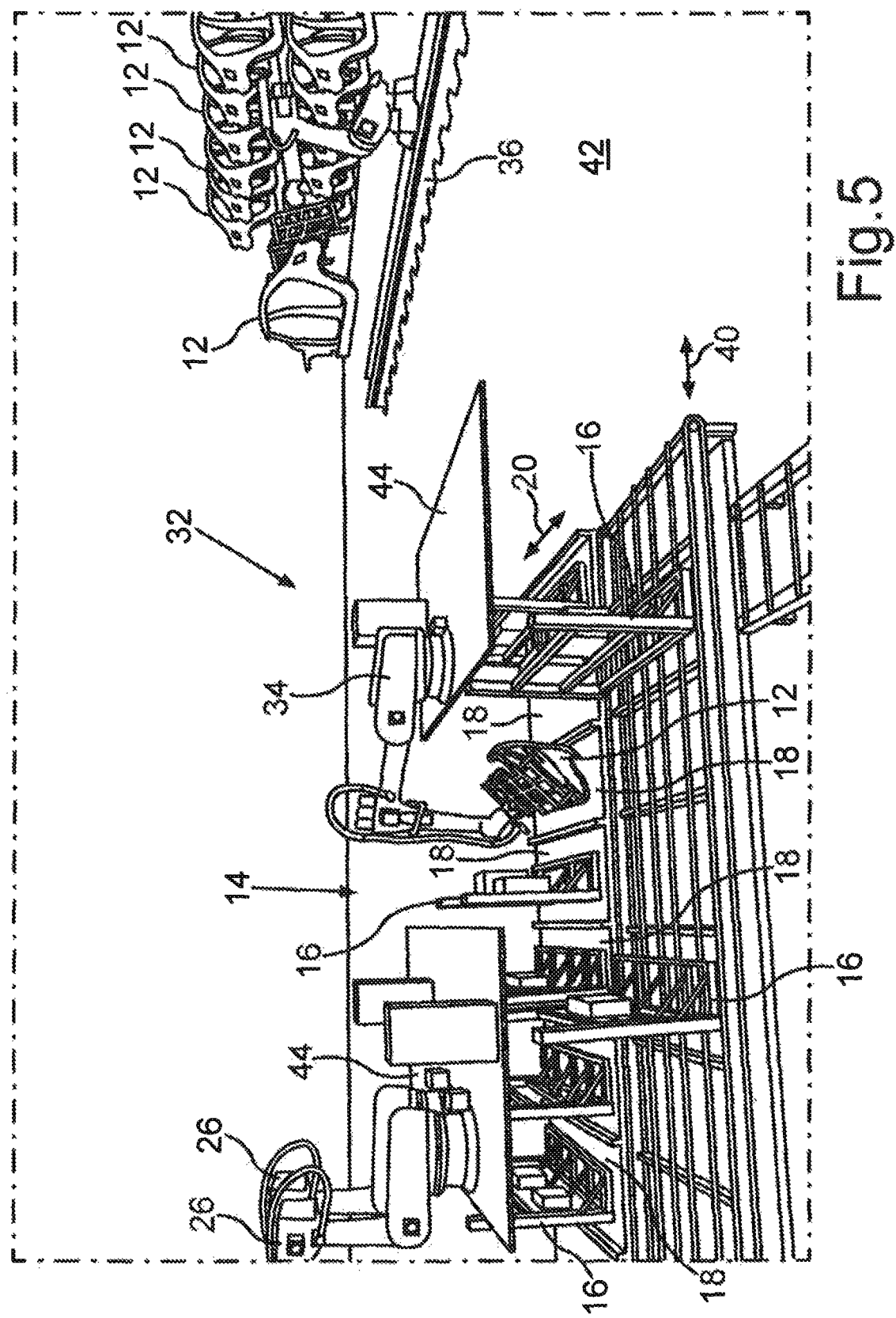
FIG. 5 is a perspective detailed view of the extraction station of the production system, wherein a welded together side wall assembly variant is being extracted from one of the clamping frames by a robot.

FIG. 5 shows essentially the extraction station 32 in a perspective detailed view, in which one of the finished shell assembly variants 12 is being extracted from one of the clamping frames 16 by means of the robot 34, which frame is positioned below the robot 34 in the extraction station 32. The magazine 14, in which several of the clamping frames 16 not presently in use are arranged in the respective receiving areas 18, can also be discerned in the background. Once the finished shell assembly variant 12 has been removed by the robot 34 from the clamping frame 16 disposed below the robot 34, the clamping frame 16 in question is then returned to the magazine 14, where it is repositioned in one of the receiving areas 18 parallel to the other clamping frames 16 accommodated in the magazine 14.

The clamping frames 16 can also comprise receiving areas for the component variants 24 for a specific shell assembly variant 12 on a first side and receiving areas for the component variants 24 for the same or for another shell assembly variant 12 on a second side. Hence both sides of the clamping frames 16 can be used; for instance, left and right side wall parts of a vehicle or two different side wall parts of the same vehicle type can thus be manufactured in a single cycle.

All in all, the production system 10 and the method for producing different shell assembly variants 12 explained herein provide an especially space-saving and efficient option for producing a large number of different shell assembly variants 12 by means of the same production system 10. For example, not only a large number of different side wall assembly variants but also other assembly variants can be produced for a vehicle shell of a wide variety of vehicle types such as vans, station wagons, limousines, coupes, and the like on the same production line 10. A versatile production is made possible for a large number of shell assembly variants through the use of clamping frames 16 respectively configured for specific vehicle types and/or specific shell assembly variants.

The invention claimed is:

1. A production system for producing different shell assembly variants of vehicle types, comprising:
    clamping frames, wherein each of the clamping frames is adapted in a variant-specific manner for receiving respective component variants that are associated with the different shell assembly variants;
    a magazine, wherein the clamping frames are arrangeable in the magazine and wherein the magazine includes a plurality of receiving areas in which the clamping frames are respectively displaceable in a movement direction and receivable parallel to each other;

a clamping station, wherein, in accordance with a presettable production sequence of the different shell assembly variants, the respective component variants are respectively positioned on the clamping frames in a respectively preset joining arrangement;

wherein the clamping station is disposed in the movement direction adjacent to the magazine;

a joining station, wherein, in accordance with the presettable production sequence, the respective component variants positioned on the respective clamping frames are connectable to each other to form corresponding shell assembly variants; and a transport device, wherein, in accordance with the presettable production sequence, the clamping frames are movable from the magazine to the clamping station only in the movement direction, and to the joining station, exclusively in translation in a plane by the transport device.

2. The production system according to claim 1, wherein the clamping station includes a plurality of robot-controlled grippers, wherein the respective component variants are positioned on the respective clamping frames by the plurality of robot-controlled grippers.

3. The production system according to claim 2, wherein the plurality of robot-controlled grippers are adjustable to specific geometries of the respective component variants in accordance with the presettable production sequence.

4. The production system according to claim 1, further comprising an extraction station, wherein the formed corresponding shell assembly variants are extracted from the respective clamping frames at the extraction station.

5. The production system according to claim 4, wherein the clamping frames are movable from the extraction station to the magazine by the transport device.

6. The production system according to claim 1, further comprising a transport system, wherein the respective component variants are conveyable to the clamping station in accordance with the production sequence by the transport system.

7. The production system according to claim 1, wherein the clamping frames include respective clamping devices for fixing the respective component variants.

8. The production system according to claim 1, wherein the clamping frames include respective receiving areas for respective component variants of a first shell assembly variant on a first side and respective receiving areas for respective component variants of a second shell assembly variant on a second side.

9. A method for producing different shell assembly variants of vehicle types, comprising the steps of:

selecting a clamping frame from a plurality of variant-specific clamping frames arranged in a magazine in accordance with a preset production sequence of the different shell assembly variants, wherein the magazine includes a plurality of receiving areas in which the plurality of variant-specific clamping frames are respectively displaceable in a movement direction and receivable parallel to each other;

translationally moving, only in the movement direction, the selected clamping frame from the magazine to a clamping station which is disposed in a same plane as the magazine and which is disposed in the movement direction adjacent to the magazine;

arranging of respective component variants that are associated with a shell assembly variant in respective joining positions on the selected clamping frame moved to the clamping station in accordance with the preset production sequence;

translationally moving the selected clamping frame with the respective component variants from the clamping station to a joining station which is disposed in the same plane as the magazine and the clamping station; and joining of the respective component variants to each other in the joining station in accordance with the preset production sequence to form the shell assembly variant.

\* \* \* \* \*